(12) United States Patent
Kim et al.

(10) Patent No.: US 9,716,408 B2
(45) Date of Patent: Jul. 25, 2017

(54) REDUNDANT RESIDENTIAL POWER SOURCES

(71) Applicant: Google Inc., Mountain View, CA (US)

(72) Inventors: Sangsun Kim, San Jose, CA (US); Anand Ramesh, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/808,917

(22) Filed: Jul. 24, 2015

(65) Prior Publication Data
US 2017/0025891 A1    Jan. 26, 2017

(51) Int. Cl.
*H02J 9/06* (2006.01)
*H02J 7/00* (2006.01)
*H02J 1/10* (2006.01)

(52) U.S. Cl.
CPC ............... *H02J 9/061* (2013.01); *H02J 1/10* (2013.01); *H02J 7/0031* (2013.01); *H02J 7/0068* (2013.01); *H02J 7/0077* (2013.01)

(58) Field of Classification Search
CPC .......... H02J 1/10; H02J 7/0031; H02J 7/0077; H02J 9/062
USPC .......................................................... 307/66
See application file for complete search history.

(56) References Cited

U.S. PATENT DOCUMENTS

| | | | |
|---|---|---|---|
| 5,420,451 | A | 5/1995 | Williams et al. |
| 5,539,630 | A | 7/1996 | Pietkiewicz et al. |
| 5,682,050 | A | 10/1997 | Williams |
| 6,313,610 | B1 | 11/2001 | Korsunsky |
| 7,816,814 | B1 | 10/2010 | Hennessy et al. |

FOREIGN PATENT DOCUMENTS

| | | |
|---|---|---|
| EP | 2562555 | 2/2013 |
| JP | 2015-035925 | 2/2015 |

OTHER PUBLICATIONS

International Search Report and Written Opinion in International Application No. PCT/US2016/042758, mailed Sep. 27, 2016, 12 pages.

*Primary Examiner* — Robert Deberadinis
(74) *Attorney, Agent, or Firm* — Fish & Richardson P.C.

(57) ABSTRACT

Methods, systems, and apparatus, including computer programs encoded on a computer storage medium, for controlling a battery power source. In one aspect, a system includes a first MOSFET having a first gate, a first source, and a first drain. A second MOSFET having a second gate, a second source, and a second drain. The first source is connected to the second source, and the second drain is coupled to a ground. A control circuit connected to the first gate and the second gate and that provides control signals to the first gate and the second gate that cause the first and second MOSFETS to operate in saturation regions during a first operational state to cause the first power source to discharge and the first MOSFET operates in a linear region during a second operational state to limit a charging current that charges the first power source.

18 Claims, 5 Drawing Sheets

REDUNDANT RESIDENTIAL POWER SOURCES

BACKGROUND

This specification relates to bi-directional switches and disconnects for redundant power systems.

Many redundant commercial and residential power systems include a power source (e.g., AC grid, solar power, wind power, etc.) and a back-up power source (e.g., battery, battery bank, generator, etc.). The power source can be an AC or DC power source that provides power to a load. The back-up power source can include an inverter to convert DC power to AC power to provide AC power to the load. The power systems supply power to critical and non-critical loads and the system ensures that in the event the power source loses functionality, the back-up power source provides power to continue the load's operation and functionality.

SUMMARY

In general, one innovative aspect of the subject matter described in this specification can be embodied in systems and methods that include a first MOSFET having a first gate, a first source, and a first drain. A second MOSFET having a second gate, a second source, and a second drain. The first source is connected to the second source, and the second drain is coupled to a ground. A first power source having a first power terminal and a second power terminal, where the first power terminal is connected to the first drain and second power terminal is connected to a DC bus. A second power source having a third power terminal and a fourth power terminal, where the third power terminal is connected to the ground and the fourth power terminal is connected to the DC bus. A control circuit connected to the first gate and the second gate and that provides control signals to the first gate and the second gate that cause the first and second MOSFETS to operate in saturation regions during a first operational state to cause the first power source to discharge and the first MOSFET operates in a linear region during a second operational state to limit a charging current that charges the first power source. Other embodiments of this aspect include corresponding systems, apparatus, and computer programs, configured to perform the actions of the methods.

Particular embodiments of the subject matter described in this specification can be implemented so as to realize one or more of the following advantages. The systems and methods disclosed herein facilitate a transition of providing power from a primary power source to a secondary power source using inexpensive MOSFET switches instead of an active battery converter. By utilizing a bi-directional switch, the systems and methods can discharge (e.g., provide power) a secondary power source and can charge the secondary power source. In doing so, charging to discharging and discharging to charging transitions are automatically achieved by voltage and current controllers. In addition, the bi-directional switch can disconnect the secondary load from a power bus in the event of a fault on the power bus. The transition from charging to discharging to disconnecting is achieved with voltage and current controllers each independently regulating current and voltage during charging.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A redundant power system enables a load to receive uninterrupted power if a primary power source is unable to independently provide power to the load. Typically, the redundant power system includes a power source and/or a back-up power source to power the load by transitioning the supply of power from the primary power source to the power source and/or back-up power source. A bi-directional switch that is activated by a controller can effectuate the back-up power source during a loss of functionality by the primary power source and/or the power source. In addition, the bi-directional switch also enables a reverse flow of current to charge or re-charge the back-up power source.

The bi-directional switch also operates as a disconnect switch that can isolate the back-up power source from the load. For example, in the event of a fault within the system the controller operates the bi-directional switch to disconnect the back-up power supply from the load mitigating an over-current situation that may damage the back-up power source.

The redundant power system can include a power conversion architecture for a residential home that is based on one or more energy sources coupled together with a battery system. For example, the load may be an AC load or a DC load, the primary power source can be the AC grid, and the power source can be a photovoltaic system, a wind turbine, a generator, etc. The power source includes an AC power source coupled with a converter or a DC power source that includes an energy conversion mechanism (e.g., buck-boost transformer). The back-up power source can include a battery or some other direct current supplying energy source (e.g., photovoltaic system, wind turbine, etc.) that supplements power to the redundant power system.

These features and other features will be described in more detail below.

Figure 1:
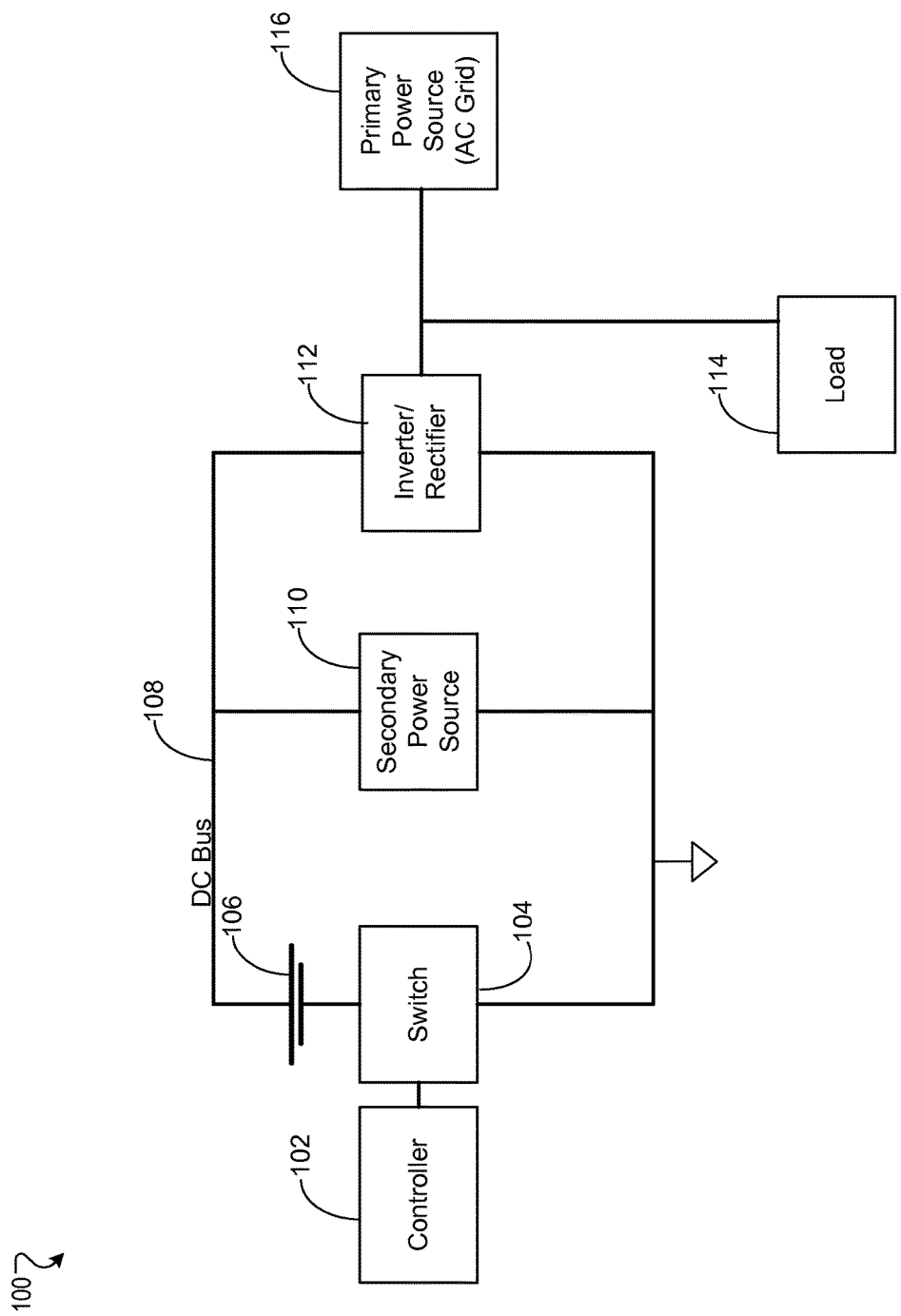
FIG. 1 is a block diagram of an example redundant power system.

FIG. 1 is a block diagram of an example redundant power system 100. The power system 100 provides uninterruptible power to a load 114. In the example that follows, the system 100 will be described in the application of a residential power system. However, the system can be applied in other settings, such as in commercial applications and industrial applications.

The power conversion architecture for a residential home is based on at least one energy source couple with a battery system. For example, the redundant power system 100 can include a controller 102, a switch 104, a battery 106, a DC bus 108, a secondary power source 110, an inverter/rectifier 112, and a primary power source 116. Typically, the primary power source 116 is the main source of power (e.g., AC grid).

The secondary power source 110 can include an energy converter that can convert AC power to DC power or can transform a DC voltage to a different DC voltage. The secondary power source can be a solar power system, a wind turbine system, a generator, or any other power delivery system of the like. The secondary power source 110 provides DC power to the DC bus 108.

The inverter/rectifier 112 receives power from the DC bus 108, converts the DC power to AC power to supply to a load 114. Here the load 114 represents common household electronic devices that are used within a home, commercial buildings, or utility infrastructure. The inverter/rectifier 112 can be a rectifier, a solar inverter/rectifier, or any other mechanism that converts AC power to DC power.

In some implementations, the inverter/rectifier 112 can be a rectifier that converts AC power received from the grid to DC power. For example, the inverter/rectifier 112 may receive power from the AC grid, convert the power to DC to supply DC power to the DC bus 118. Often a power system may have a second harmonic (e.g., 120 Hz) ripple voltage that can exist on the DC bus that is proportional to the current of the inverter/rectifier output power. The second harmonic ripple voltage is also inversely proportional to the DC bus capacitance. The ripple voltage can be minimized by increasing the DC bus capacitance or lowering the inverter/rectifier output current.

The battery 106 is a back-up power source that provides direct current to the DC bus 108 in the event the primary and secondary power source 110 fail to independently provide power to the load 114. The battery 106 can be a single battery or a group of batteries coupled together, which ever configuration is sufficient to provide enough current to power the load 114. Typically, the battery 106 is a rechargeable battery that can discharge stored energy when it is providing DC power and can charge by accepting a direct current to replenish stored energy within the battery. For example, the battery 106 may receive DC power that is supplied by the AC grid and rectified by the inverter/rectifier 112.

The battery 106 can also operate in response to an additional power demand. In some instances, the load may require more power than can be supplied by the primary and/or secondary power source. In such an event, the battery 106 may supply supplemental power to the load 114. In addition, the battery 106 can be operational for charging and discharging for efficient energy flow that maintains a constant voltage and/or current supplied to the load 114.

The battery 106 works in conjunction with a switch 104 during charging and discharging of the battery 106. The switch 104 enables a bi-directional flow of current to and from the DC bus 108. For example, when the battery is discharging, current is flowing out of the battery. Conversely, when the battery is charging, current is flowing into the battery. In addition, the switch can also disconnect the battery 106 from the bus if an event occurs that may adversely affect the battery, such as a fault being detected on the bus.

To manipulate the various functions of the switch 104, the switch 104 is controlled by the controller 102. The controller 102 operates the switch to enable current to flow in the direction determined by the redundant power system 100. For example, the controller 102 can provide a control signal to the switch that dictates an operational state of the switch (e.g., forward current flow, reverse current flow, no current flow, etc.) In some implementations, the controller 102 can be an analog controller or a digital (e.g., processor, electronic control system, etc.). Further details regarding the switch 104, the controller 102, and different implementations of the switch 106 and the controller 102 are described in connection with FIGS. 2, 3, and 4 below.

Figure 2:
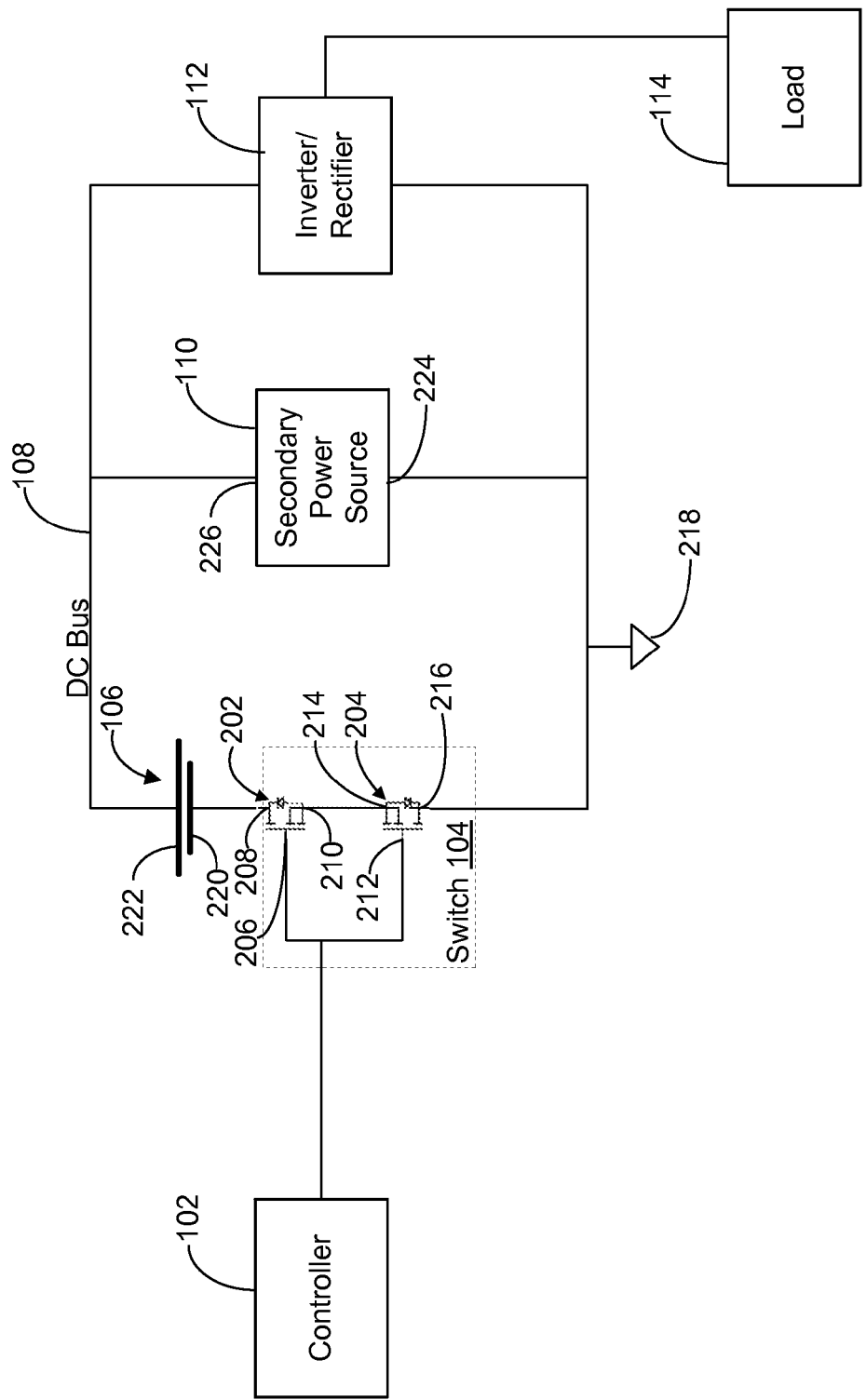
FIG. 2 is a block diagram of the example redundant power system that includes a switch and a controller.

FIG. 2 is a block diagram of the example redundant power system 100 that includes a switch 104 and a controller 102. In one implementation, the switch 104 is a bi-directional switching circuit 104 that includes two transistors connected in series. For example, the two transistors can be MOSFETs 202, 204. By operating the MOSFETs 202, 204 in their various operational states (e.g., linear region, saturation region, cut-off region, etc.), the MOSFETs function to direct the flow of current as determined by the redundant power system controller 102.

As shown in FIG. 2, the bi-directional switching circuit 104 includes a first MOSFET 202 that has a first gate 206, a first drain 208, and a first source 210. The bi-directional switching circuit 104 also includes a second MOSFET 204 having a second gate 212, a second source 214, and a second drain 216. In one implementation, the first source 210 of the first MOSFET 202 is connected to the second source 214 of the second MOSFET 204, and the second drain 216 of the second MOSFET 204 is coupled to a ground 218. In other implementations, the first drain 208 of the first MOSFET 202 can be connected to the second drain 216 of the second MOSFET 206.

The redundant power system 100 includes a first power source (e.g., the battery 106) having a first power terminal 220 and a second power terminal 222. In one example, the first power terminal 220 is connected to the first drain 208 and the second power terminal 222 is connected to a DC bus 108. As previously described, the first power source provides power to the DC bus 106 when the first power source is discharging. Generally, the battery 106 discharges when the second power source (e.g., the primary power source and/or the secondary power source) 110 is unable to independently power the load 114.

The redundant power system also includes a second power source (e.g., the secondary power source) 110 having a third power terminal 224 and a fourth power terminal 226. In one implementation, the third power terminal 224 is connected to the ground 218 and the fourth power terminal 226 is connected to the DC bus 108. Generally, the second power source 110 is the secondary power source that can provide power to the load 114 for the redundant power system 100.

The operational state of the MOSFETS 202, 204 is typically controlled by a control circuit (e.g., the controller 102) that is connected to the first gate 206 and the second gate 212. The controller 102 provides control signals to the first gate 206 and the second gate 212. In the example shown, the gates 206 and 212 are coupled to the same control signal; however, depending on the controller design, the gates can be operated separately and the MOSFETs 202 and 204 can be operated in different states so long as the charging and discharging characteristic described below are realized.

In some implementations, the control signal causes the first and second MOSFETs 202, 204 to operate in saturation regions during a first operational state to cause current to flow (e.g., 0~100 A) from the first power source (e.g., the battery 106). The controller can also provide control signals to the first and second MOSFETs 202, 204 to cause the first MOSFET 202 to operate in a linear region during a second operational state (i.e., the linear region). Operating in the linear region limits the amount of charging current that is provided to the first power source during the charging process. Limiting the charging current that is received by the first power source enables a controlled charging of the first power source and ensures that the current draw does not exceed the current capability of the primary source.

Operational states of the switching circuit 104 is dependent, in part, on the DC Bus voltage. Upon failure of the second power source 110 to independently provide power to the load, the voltage on the DC bus 108 diminishes. The control circuit (e.g., the controller 102) determines that the first operational state occurs when the voltage of the DC bus 108 is less than a voltage of the first power source (e.g., the battery 106) as measured between the first power terminal 220 and the second power terminal 222. The control circuit sends a control signal to the MOSFETs that cause the MOSFETs to operate in the first operational state (e.g., saturation region). Operating in the saturation region enables the first power source to begin powering the load and deplete the energy stored within the first power source.

The control circuit (e.g., the controller 102) also determines the second operational state occurs when the voltage of the DC bus 108 is greater than the voltage of the first power source as measured between the first power terminal 220 and the second power terminal 222. The voltage of the DC bus 108 being higher than the voltage of the first power source is usually indicative of the second power source (e.g., the secondary power source 110) and/or the primary power source 116 returning to operation. After the battery discharges and the second power source 110 returns to operation, the second operational state (e.g., linear mode) enables current to be delivered to the first power source to charge the first power source. Operating the MOSFETs in linear mode provides a current controlling mechanism that limits the amount of current delivered to the first power source.

The control circuit (e.g., the controller 102) can also detect a fault condition on the DC bus 108. To protect the first power source from damage caused by a potential over current situation, the control circuit sends a control signal to operate the first MOSFET and the second MOSFET in a cut-off mode. The cut-off mode opens the portion of the circuit that is connected to the first power source which disables the flow of current to the first power source.

In some implementations (not shown), the redundant power system can be scaled to include multiple sets of MOSFETs. For example, the redundant power system 100 can include two or more sets of MOSFETs connected in parallel between the battery 106 and ground 218. In some implementations, each pair of MOSFETs can have a dedicated controller to dictate the operational states for each pair of MOSFETs. In other implementations, each individual MOSFET can have its own dedicated controller to dictate the operational state for an individual MOSFET. The controllers can be communicatively linked and determine collectively the operational state for each of the MOSFETs or each controller can independently determine the operational state for its MOSFET.

In some implementations, the controller 102 can include an analog circuit or a digital circuit. For example, the control circuit (e.g., the controller 102) can include a processing device that is coupled to the first and the second gate 206, 212 and provides control signals to the first and second MOSFETs 202, 204 to operate the MOSFETs in the different operational states.

Figure 3:
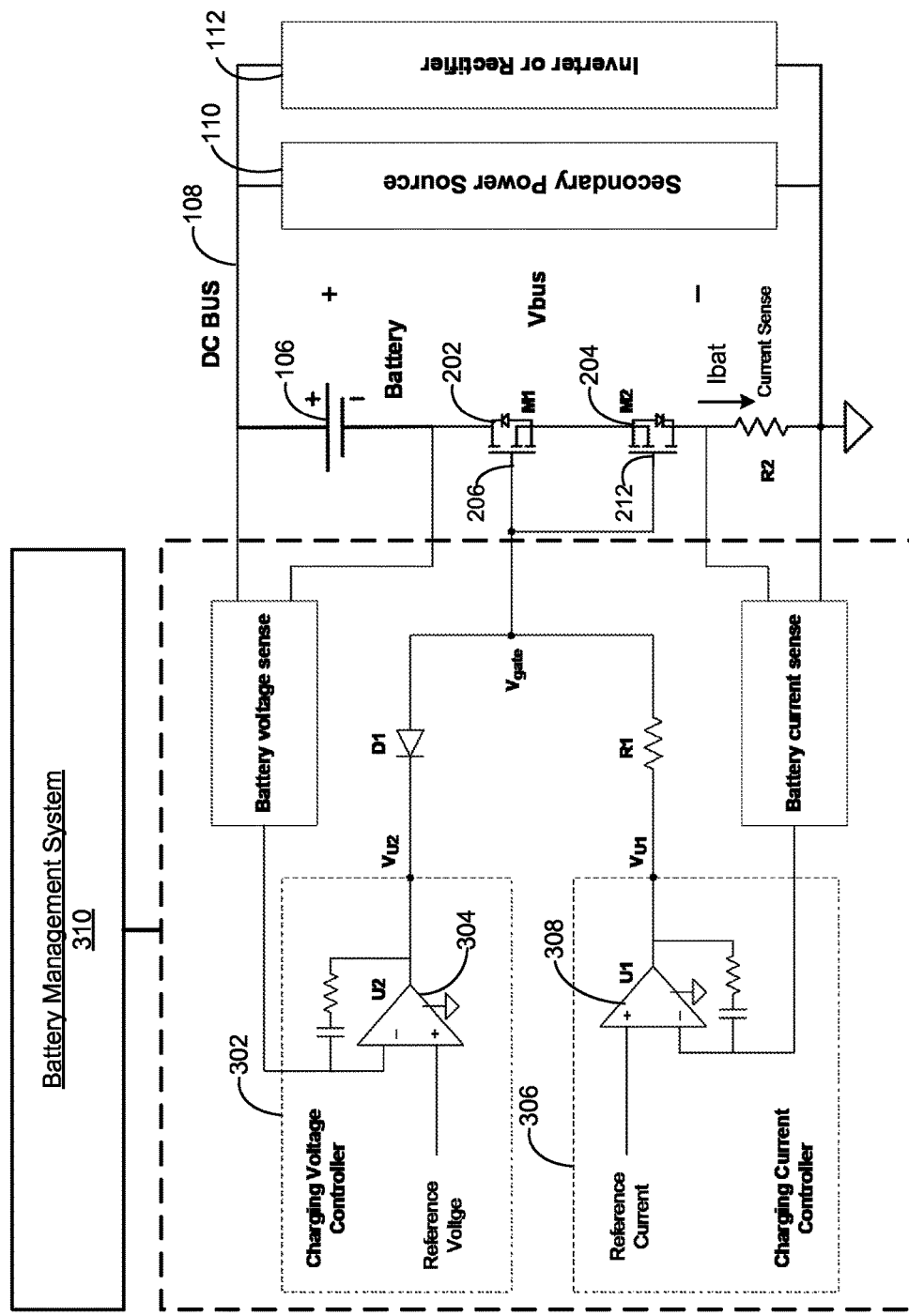
FIG. 3 is a circuit diagram of an example controller.

One example implementation using analog components is shown in FIG. 3, which is a circuit diagram of an example controller 102. The control circuit of the controller 102 includes a charging voltage control circuit 302 and a charging current control circuit 306. The charging voltage control circuit 302 includes a first amplifier 304 and an output of the first amplifier is coupled to the first gate 206 and the second gate 212 through a diode D1. The charging voltage control circuit 302 can sense the voltage of the battery 106 and compares it to a reference voltage, e.g., a voltage that is less than the voltage of the DC bus. When the battery voltage is much less than the reference voltage, the output Vu2 will be high. When the battery voltage is much higher than the reference voltage, the output Vu2 will be low; otherwise Vu2 will be adjusted to regulate the battery voltage. Further details about the reference voltage will be described in connection with FIG. 4.

The charging current control circuit 306 includes a second amplifier 308 that has an output that is coupled to the first gate 206 and the second gate 212. The charging current control circuit 306 senses the battery current by means of the current sense resistor R1. Similar to the battery voltage, when the battery current is much less than the reference current, the output of the Vu1 will be high. When the battery current is much higher than the reference current, the output of the VU1 will be low; otherwise VU1 will be adjusted to limit or regulate the battery current.

Together the outputs Vu1 and Vu2 cooperative control charging and discharging of the battery. More specifically, the output of u1 regulates or limits the charging current by adjusting the gate-to-source voltage of the MOSFETs 206 and 212 to operate in the linear operational region during charging. The output of u2 is coupled by a diode (D1) so that the battery voltage is regulated at a certain level.

In some implementations, the operations of the controller 102 may be further subject to a battery management system 310 that would govern, according to one or more optimization constraints, when the battery can discharge or charge. The battery management system 310 can override the controller 102 to either enable or disable charging and discharging of the battery dependent upon the optimization constraints. For example, during peak power times, when it may be more expensive to consume power, the battery management system 310 may suspend or limit the battery charging operation.

The battery management system 310 can govern other aspects of the redundant power system 100. In some implementations, the battery management system 310 can override operations of the system to dictate voltage levels, current draw, operational state of the switch (e.g., MOSFETS 202, 204), and other operations of the like. For example, the battery management system 310 may determine, due to load constraints or some other system attribute, to adjust (e.g., lower or raise) the voltage the of the DC bus 108 by sending operational instructions to the inverter 112.

Operation of the circuit of FIG. 3 is described with reference to FIG. 4, which is a diagram illustrating example current and voltage waveforms representative of one example of the redundant power system's various operations. The current and voltage waveforms detail one example of the redundant power system operations for providing uninterruptible power to a load 114.

Figure 4:
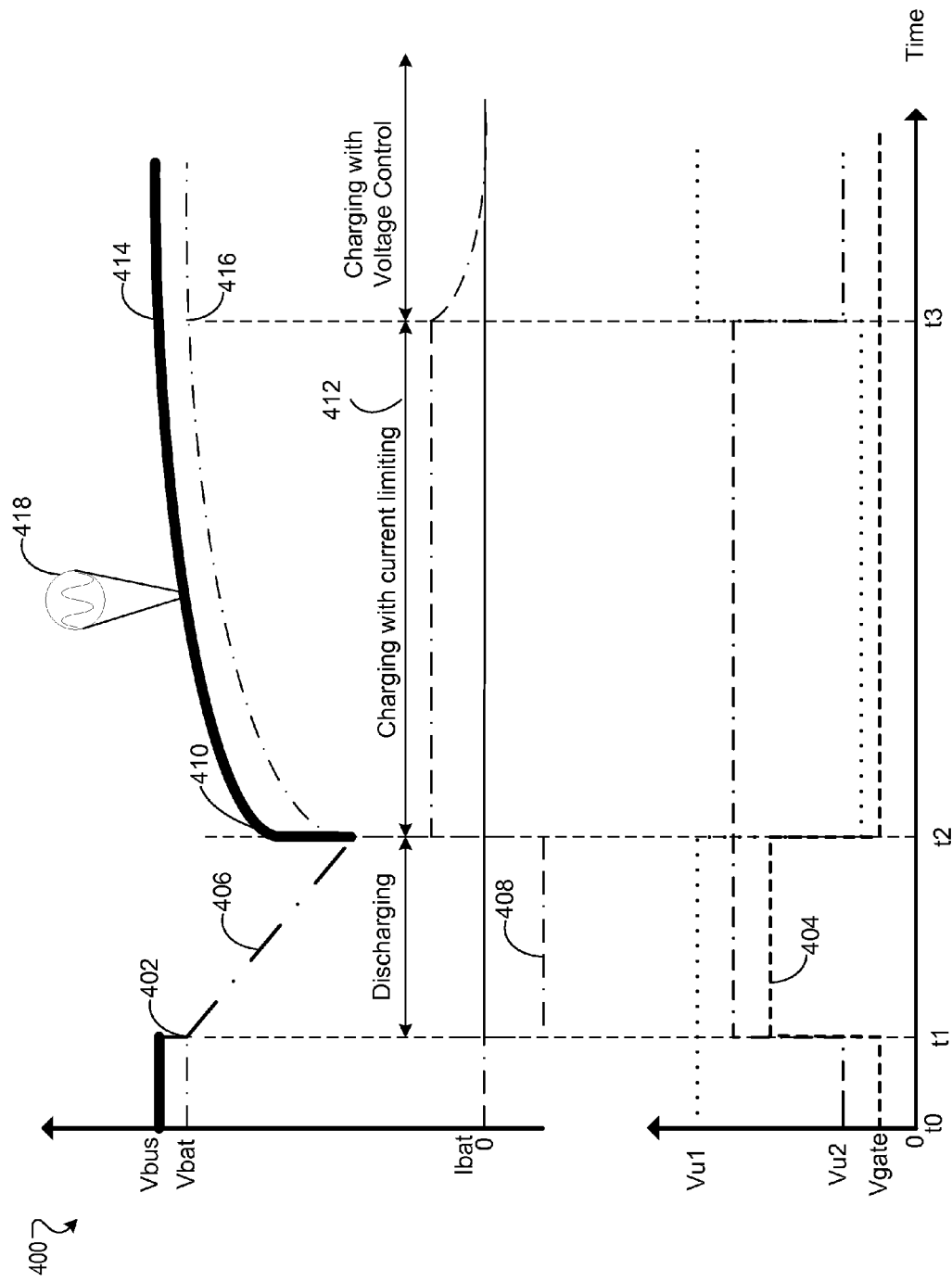
FIG. 4 is a diagram illustrating example current and voltage waveforms representative of various operations of the redundant power system.

Referring to FIG. 4, at time t0, the redundant power system is operating with the secondary power source 110 independently providing power to the inverter/rectifier 112. The DC bus voltage is maintained at a higher voltage than the battery voltage, Vbat, during the charging mode or when the secondary power source 110 is independently providing power to the inverter/rectifier 112. The battery is fully charged and thus the current, Ibat, is almost zero (or some nominal leakage or inactive value) since the battery is not providing power to the inverter/rectifier 112. The output voltage of the charging current controller 306, VU1, is high (e.g., significantly greater than a "zero" output, such as at or near the positive rail).

The output of the charging voltage controller 302, Vu2, is low. Because the battery voltage is at or above the reference voltage value, the charging voltage controller is regulating the battery voltage. In some implementations, the reference voltage value is a reference value that is less than the specified DC bus voltage since the DC bus has the 120 Hz ($2^{nd}$ harmonic) ripple voltage 418. As will be explained below, the reference value being less than the specified DC bus values enables regulation of the battery voltage during the last portion of the battery recharging phase, which is referred to as a third operational state.

Time t1 illustrates the secondary power source 110 failing to independently supply power to the inverter/rectifier 112. During this time, the battery is discharging. In some implementations, the battery can deliver power to the inverter/rectifier 112 without an failure of the primary and/or secondary power sources. The controller 102 monitors a voltage of the DC bus 108 indirectly by means of monitoring the battery 106 voltage. The battery voltage falling below a reference voltage is indicative of the DC bus being at or below the battery voltage. The voltage for the DC bus is typically provided by the secondary power source 110, but as shown at t1 the DC bus voltage has reached the battery voltage. Thereafter, the controller determines that the voltage of the DC bus 108 is below a battery voltage (402) due to the battery voltage falling below the reference voltage. In response to determining that the battery voltage is below the reference voltage and the battery charging current is less than a reference current, the controller 102 provides a control signal to operate the first and second MOSFETS 202, 204 in saturation regions to cause the battery to discharge onto the DC bus 108.

As shown at time t1 in the circuit of FIG. 3, the output of the charging current controller, Vu1, remains high and the charging voltage controller, Vu2, switches its output to high. This results is a high gate voltage at Vgate (404). The high Vgate voltage drives the MOSFETs 202, 204 to a saturation region allowing current to flow from the battery 106 to the DC bus 108. Between the times t1 and t2, the battery 106 is discharging as indicated by the decreasing battery voltage Vbat (406). Accordingly, the battery current, Ibat, is negative (408), indicating power being supplied by the battery 106 to the inverter/rectifier 112. The negative value of Ibat also maintains the output VU1 high, as the negative results in a current sense signal that is less than the reference current voltage signal. Thus, the time from t1 to t2 is a first operational state in which the first and second MOSFETS to operate in saturation regions and the first operational state occurs when the voltage of the DC bus is less than a voltage of the battery as measured between the first power terminal and the second power terminal of the battery.

During this time, the power loss of MOSFET 204 determined by the on-resistance $R_{M2}$ of the MOSFET 204 during discharging:

$$P_{Loss}=I_{Bat,dischg}^{2} \cdot R_{M2}$$

The time t2 represents a second operational state during which the first MOSFET operates in a linear region to limit a charging current that charges the battery. This state is caused by the combination of the voltage of the DC bus being greater than the voltage of the battery and the voltage of the battery being less than the reference voltage input amplifier 304, which results in a battery current regulated at a reference current. In particular, in the example circuit of FIG. 3, this condition of the DC bus voltage being higher than the battery voltage causes the battery to charge Referring to FIG. 4, the time t2 illustrates the secondary power source 110 returning to operation as the DC bus voltage, Vbus, is higher than the battery voltage, Vbat (410). In response to the DC bus voltage being higher than the battery voltage but lower than the reference voltage, the controller 102 cooperatively operates the first and second MOSFETs 202, 204 to cause the battery to charge from the DC bus by a controlled current and independent of control of the battery voltage. For example, the controller 102 provides a control signal to the MOSFETs 202, 204 by changing the output voltage of the charging current controller 306, VU1. The voltage Vgate is determined by a voltage drop across resistor R1 that places the first and second MOSFETs 202, 204 in a linear mode, limiting the amount of current provided to the battery.

Operating at least the first MOSFET 202 in linear mode effectuates charging the battery 106 with limited current. As shown in FIG. 4, Ibat is positive (412), indicating that the battery 106 is receiving current during the charging process.

Time t3 illustrates a time when the battery voltage has reached a reference voltage and the battery 106 begins to be charged with a controlled voltage. This is referred to as a third operational state. In this state, the nominal voltage of the DC bus (414) is higher than the battery voltage (416), and the battery voltage is at least equal or close to the reference voltage. Because the reference voltage is less than the specified DC bus voltage, the battery voltage is thus controlled to maintain the battery voltage below the DC bus voltage to prevent damage and cycling effects of the battery due to the second harmonic (e.g., 120 Hz) ripple voltage 418 that is on the DC bus 108.

In operation, the controller 102 senses that the voltage of the DC bus 108 meets a reference voltage. In response, the controller 102 cooperatively operates the first and second MOSFETs 202, 204 to cause the battery to charge from the DC bus 108 by a controlled voltage and independent of control of the current. For example, the charging voltage controller 302 changes its output voltage, VU2. The resulting decreases in Ibat causes the output VU1 to go high. The resulting gate voltage Vgate, determined by the blocking diode D1 operates the MOSFET 202 in the linear region, but the battery voltage is regulated by the positive difference between the battery voltage and the reference voltage.

During the second and third operational state (during charging), MOSFET 202 operates in the linear operational region. Power loss of the MOSFET during charging is mainly determined by Vbus as, $$P_{Loss}=(V_{bus}-V_{bat}) \times I_{bat,chg}$$

In some implementations, to lower Ploss during charging, the DC bus voltage Vbus remains close to the battery voltage Vbat. Thus Vbus is adjusted/regulated at slightly higher voltage than the battery voltage Vbat by an energy converter and/or an inverter/rectifier.

Figure 5:
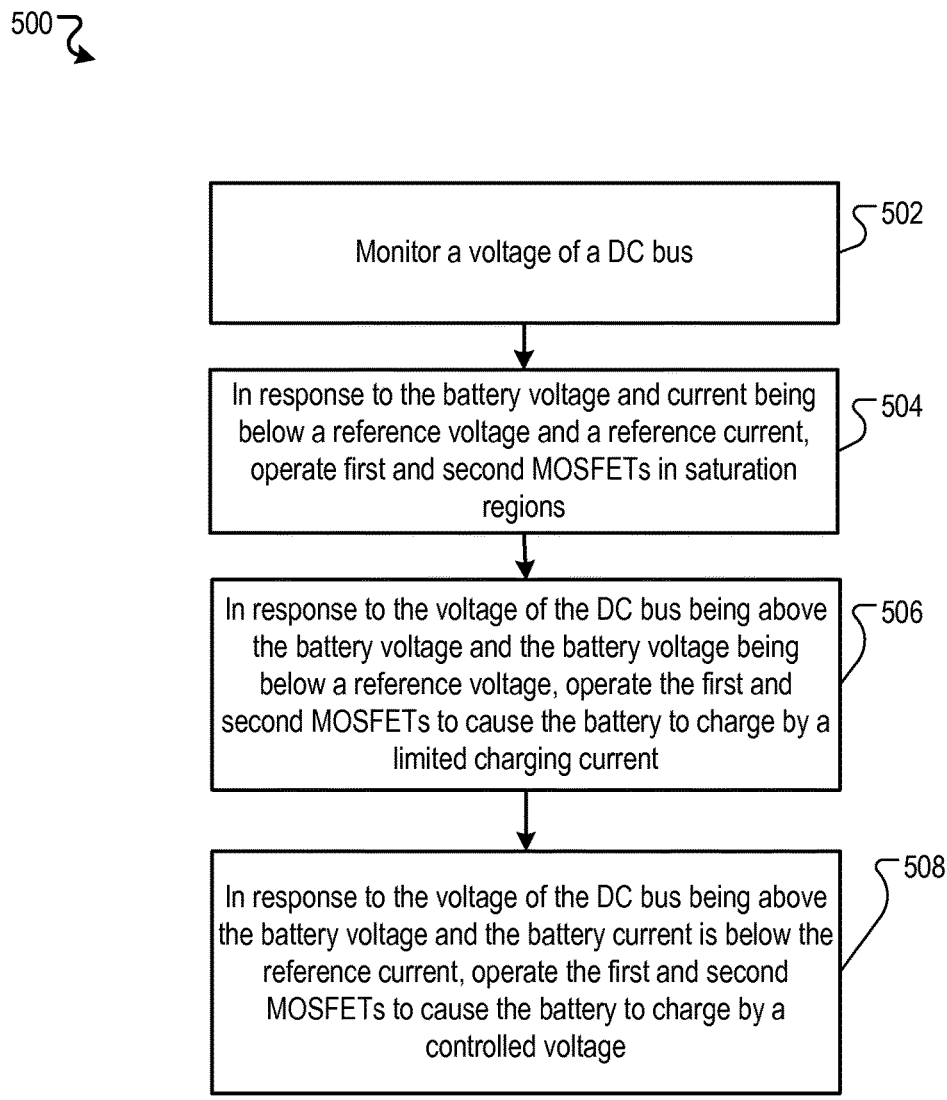
FIG. 5 is flow diagram of a redundant power system operation.

FIG. 5 is flow diagram of a redundant power system operation. The flow diagram describes one implementation of providing back-up power to a load 114 by a primary and/or secondary power source 110, a battery 106, a controller 102, and a bi-directional switching converter 104. In some implementations, the redundant power system 100 can be used as an uninterruptible power supply. In other implementations, the redundant power system 100 can be used as a back-up power supply to supply supplemental power, additional power, etc. to the inverter/rectifier 112. The process includes a processing device (e.g., analog controller, digital controller, etc.) that is configured to monitor a voltage of a DC bus 108 (502). As previously described, when the primary and/or secondary power source 110 is independently powering the load 113, the voltage for the DC bus 108 is being provided by a primary and/or secondary power source.

The process determines that the battery voltage and current are below a reference voltage and a reference current and in response operating the first and second MOSFETs 202, 204 in saturation regions (504). Operating the first and second MOSFETs 202, 204 in saturation regions closes the portion of the circuit that is connected to the battery 106 enabling the battery to discharge current onto the DC bus providing back-up power to the load 114.

Upon the primary and/or secondary power source 110 returning to operation, the process determines that the voltage of the DC bus 108 is above the battery voltage and the battery voltage is below a reference voltage, and in response cooperatively operates the first and second MOSFETs 202, 204 to cause the battery to charge by a limited charging current (506). The battery receives current from the DC bus 108 by a controlled current and independent of control of the battery voltage. The first and second MOSFETs 202, 204 operate in a linear mode to provide a current limiting mechanism that controls the amount of current received by the battery. In some implementations, during this portion of the charging process, the charging voltage controller does not control the voltage of the battery (e.g., Vbat). For example, the voltage of the battery 106 is enabled to recover at an uncontrolled rate according to the amount of current that is delivered to the battery, and is only limited by the charging current.

The battery voltage recovers until it is determined that the voltage of the battery meets the reference voltage, the battery current is below a reference current, and in response the process 500 cooperatively operating the first and second MOSFETs 202, 204 to cause the battery to charge from the DC bus 108 by a controlled voltage and independent of control of the current (508). As previously described, the charging voltage controller 302 adjusts the voltage of the battery 106 by adjusting the gate voltage of the first MOSFET 202. Vbat is maintained at a voltage lower than Vbus to ensure the second harmonic ripple voltage that is present on the DC bus does not have an adverse effect on the battery 106.

The example implementations above are described in the context of an analog circuit that cooperative controls gate voltages of the MOSFETS based on a battery voltage and charger current. Other appropriate analog or digital control circuits can be used to realize the functional operational states described above. For example, in other implementations, the control circuit can drive the MOSFETS 202 and 204 separately. Additionally, the controller 102 can be implemented as a processing device (not shown) to control the instructions provided to the bi-directional switching circuit 104.

Embodiments of the subject matter and the operations described in this specification can be implemented in digital electronic circuitry, or in computer software, firmware, or hardware, including the structures disclosed in this specification and their structural equivalents, or in combinations of one or more of them.

The operations described in this specification can also be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a first MOSFET having a first gate, a first source, and a first drain;
    a second MOSFET having a second gate, a second source, and a second drain, wherein the first source is connected to the second source, and the second drain is coupled to a ground;
    a first power source having a first power terminal and a second power terminal, wherein the first power terminal is connected to the first drain and second power terminal is connected to a DC bus;
    a second power source having a third power terminal and a fourth power terminal, wherein the third power terminal is connected to the ground and the fourth power terminal is connected to the DC bus; and
    a control circuit connected to the first gate and the second gate and that provides control signals to the first gate and the second gate that cause:
        the first and second MOSFETS to operate in saturation regions during a first operational state to cause the first power source to discharge; and
        the first MOSFET operates in a linear region during a second operational state to limit a charging current that charges the first power source.

2. The system of claim 1, wherein:
    the first operational state occurs when a reference voltage is higher than a voltage of the first power source as measured between the first power terminal and the second power terminal; and
    the second operational state occurs when:
        the voltage of the DC bus is greater than the voltage of the first power source as measured between the first power terminal and the second power terminal; and
        the voltage of the first power source is less than a reference voltage.

3. The system of claim 1, wherein the control circuit provides further control signals to the first gate and the second gate that causes the first MOSFET to operate in the linear region during a third operational state to regulate a voltage of the first power source.

4. The system of claim 1, wherein the third operational state occurs when:
    the voltage of the DC bus is greater than the voltage of the first power source as measured between the first power terminal and the second power terminal; and
    the voltage of the first power source is less than the reference voltage.

5. The system of claim 1, wherein the control circuit comprises:
    a charging voltage control circuit, the charging voltage control circuit including a first amplifier, wherein an output of the first amplifier is coupled to the first gate and the second gate; and
    a charging current control circuit, the charging current control circuit including a second amplifier, wherein an output of the second amplifier is coupled to the first gate and the second gate.

6. The system of claim 1, wherein the control circuit comprises:
    a charging voltage control circuit having an output of the charging voltage control circuit coupled to the first gate; and
    a charging current control circuit having an output of the charging current control circuit coupled to the second gate.

7. The system of claim 1, wherein the control circuit comprises a processing device coupled to the first and the second gate and provides control signals to the first and second MOSFETs to operate the MOSFETs in different operational regions.

8. The system of claim 1, wherein the first MOSFET is one of a plurality of first MOSFETS and the first MOSFET includes a dedicated control system.

9. The system of claim 1, wherein the second MOSFET is one of a plurality of second MOSFETS and the second MOSFET includes a dedicated control system.

10. The system of claim 1, further comprising a power management system coupled to the control circuit providing operational signals to the control circuit, the operational signals including operational instructions for the first and second MOSFETS based on optimization constraints.

11. A method, comprising:
    monitoring a voltage of a DC bus, the voltage for the DC bus being provided by a primary power source;
    determining that the voltage of the DC bus is below a battery voltage and in response operating first and second MOSFETS in saturation regions to cause the battery to discharge onto the DC bus;
    determining that the voltage of the DC bus is above the battery voltage and the battery voltage is below a reference voltage and in response cooperatively operating the first and second MOSFETs to cause the battery to charge from the DC bus by a controlled current and independent of control of the battery voltage; and
    determining that the voltage of the DC bus is above the battery voltage and that the voltage of the battery meets the reference voltage and in response cooperatively operating the first and second MOSFETs to cause the battery to charge from the DC bus by a controlled voltage and independent of control of the current.

12. The method of claim 11, further comprising:
    detecting a fault condition on the DC bus:
    operating the first MOSFET and the second MOSFET in a cut-off mode, wherein the cut-off mode opens a portion of a circuit that is connected to the battery disabling the flow of current within the portion of the circuit.

13. The method of claim 11, wherein the DC bus voltage is regulated by an energy converter.

14. The method of claim 11, wherein cooperatively operating the first and second MOSFETs to cause the battery to charge from the DC bus further comprises:
    operating the first and second MOSFETs in a linear mode limiting the amount of current provided to the battery;
    determining that the voltage for the DC bus meets a reference voltage; and
    regulating the battery voltage using a charging voltage control circuit, wherein regulating the battery voltage comprises modulating a voltage between the first gate and the first source of the first MOSFET.

15. The system of claim 11, wherein the first MOSFET is one of a plurality of first MOSFETS and the first MOSFET includes a dedicated control system.

16. The system of claim 11, wherein the second MOSFET is one of a plurality of second MOSFETS and the second MOSFET includes a dedicated control system.

17. The system of claim 11, further comprising a power management system coupled to the control circuit providing operational signals to the control circuit, the operational signals including operational instructions for the first and second MOSFETS based on optimization constraints.

18. A system, comprising:
a processing device configured to:
monitor a voltage of a DC bus, the voltage for the DC bus being provided by a primary power source;
determine that a battery voltage is below a reference voltage and in response operating first and second MOSFETS in saturation regions to cause the battery to discharge onto the DC bus;
determine that the voltage of the DC bus is above the battery voltage and the battery voltage is less than a reference voltage that is less than a specified DC bus voltage and in response cooperatively operating the first and second MOSFETs to cause the battery to charge from the DC bus by a controlled current and independent of control of the battery voltage; and
determine that the voltage of the DC bus meets the reference voltage and in response cooperatively operating the first and second MOSFETs to cause the battery to charge from the DC bus by a controlled voltage and independent of control of the current.

* * * * *